United States Patent [19]

Whiting

[11] Patent Number: 4,792,651
[45] Date of Patent: Dec. 20, 1988

[54] PRESSURE DIFFERENTIAL BYPASS SENSOR SWITCH WITH MAGNETIC THERMAL LOCKOUT

[75] Inventor: James C. Whiting, High Point, N.C.

[73] Assignee: Facet Enterprises, Incorporated, Tulsa, Okla.

[21] Appl. No.: 123,707

[22] Filed: Nov. 23, 1987

[51] Int. Cl.⁴ .............................................. H01H 35/38
[52] U.S. Cl. .................................... 200/82 E; 73/745; 335/205
[58] Field of Search ............. 200/81.9 M, 83 L, 82 R, 200/82 E, 302.1; 340/607, 611, 626; 73/744, 745; 335/205, 206, 207, 154; 116/DIG. 42, 267, 268

*Primary Examiner*—G. P. Tolin
*Attorney, Agent, or Firm*—Remy J. VanOphem

[57] ABSTRACT

A pressure differential bypass sensor switch with thermal lockout that utilizes change in position of a permanent magnet carried by a reciprocable piston responsive to pressure differential in a fluid system to actuate a magnetically actuatable electrical switch. Opposite sides of the reciprocable piston are exposed, respectively, to high pressure and low pressure sides of a filter located in a fluid circulating system. The reciprocable piston is normally positioned at the high pressure side of a passage in which it reciprocates, due to biasing by a spring acting on it from the low pressure side of the passage. As the filter becomes clogged, the pressure differential across it and, therefore, across the reciprocable piston will increase. The bypass sensor is calibrated so that a maximum allowable pressure differential in the fluid system will drive the reciprocable piston to the low pressure side of the passage. This movement of the reciprocable piston will carry the permanent magnet to a position relative to the magnetically actuatable electrical switch in which the magnetic field thereof will cause the magnetically actuatable electrical switch to actuate, thereby providing a warning signal indicating an impending filter bypass operating condition. A thermal ferrite is provided adjacent the permanent magnet. The thermal ferrite is selected to have a Curie temperature corresponding to the temperature below which fluid viscosity in the fluid system is high. In the event the reciprocable piston moves due to a pressure differential attributable to high fluid viscosity because of operation below the Curie temperature, the thermal ferrite will act to regionally confine the magnetic field of the permanent magnet, resulting in no actuation of the magnetically actuatable electrical switch.

13 Claims, 2 Drawing Sheets

PRESSURE DIFFERENTIAL BYPASS SENSOR SWITCH WITH MAGNETIC THERMAL LOCKOUT

BACKGROUND OF THE INVENTION

1. Field of the Invention

This invention relates to an electrical switch for use in switching to a bypass circuit of a liquid circulation system, such as an hydraulic system or a lubrication system for circulating lubricating oil. More particularly, this invention relates to a pressure differential switch that self-actuates as a result of an excessive pressure differential in a liquid circulation system and has a magnetically actuated thermal lockout feature.

2. Description of the Prior Art

U.S. Pat. No. 4,130,745, to Hetzer, discloses a pressure differential detector switch utilizing a piston which is free to travel within a housing. One side of the piston is exposed to the high peessure side of a pressure differential application, and the other side is exposed to the low pressure side. A spring is provided in the housing to resiliently urge the piston toward the high pressure side, in cooperation with the pressure on the low pressure side. When the force on the piston resulting from pressure differential between the high pressure side and the low pressure side exceeds the force on the piston resulting from the spring, the pressure differential force will move the piston away from the high pressure side to compress the spring. The piston carries a permanent magnet, and a reed switch is positioned on the outside of the housing to be magnetically actuated by the change in position of the piston resulting from an excessive pressure differential condition. A reed switch of the type utilized in the device disclosed in this patent has lmited current carrying capacity and a high resonant frequency due to its low moving mass and high spring constant.

U.S. Pat. No. 4,645,887, to Whiting, discloses a pressure differential bypass sensor switch. A housing is provided having two perpendicularly oriented legs, each leg having an axial passage. A reciprocable piston is mounted in one of the legs and an axial travel switch in the other. One end of the piston is exposed to the high pressure side of the fluid system and the other end of the piston is exposed to the low pressure side of the fluid system. A spring is used to bias the piston against the force caused on the piston by the differential in fluid pressure. A permanent magnet is located at the high pressure end of the piston. When the piston moves due to the force of the pressure differential exceeding the biasing force of the spring, one of the poles of the magnet moves to adjacency with the axial travel switch, causing it to actuate. Although the axial travel switch is an improvement over the reed switch, there is no provision in this invention for locking out false indications due to the higher viscosity of the system fluids when operating at low temperature.

U.S. Pat. 4,266,517, to Sakakibara et al, discloses a differential pressure switch for controlling internal combustion engines. A housing is provided which supports, by a diaphragm, a movable member. The movable member is exposed to pressure differentials existing in the fluid system on either side of the diaphragm. A spring biases the movable member against the force caused by the differential fluid pressure acting on the movable member. A permanent magnet covered with a thermal ferrite is provided on the movable member. When the movable member moves due to the force of the pressure differential exceeding the biasing force of the spring, the magnet aligns with a reed type electrical switch. Through induced magnetization in the thin blades of the reed switch, the blades are caused to contact, closing the switch. The thermal ferrite is selected to be very magnetic when below its Curie temperature, a temperature that corresponds to a high viscosity in the system fluid. Above the Curie temperature, the thermal ferrite is substantially non-magnetic, corresponding to temperatures with low viscosity in the system fluid. When the system fluid is below the Curie temperature, the thermal ferrite confines the magnetic field, preventing the magnet from actuating the reed switch blades. This invention suffers from the same problems experienced by Hetzer because a reed switch is used. Further, the use of a diaphragm mounted piston structure and the necessity that the thermal ferrite be moved with the magnet, could cause the system to suffer from insensitivity and hysteresis in response to changes in fluid pressure differential.

SUMMARY OF THE INVENTION

Accordingly, what is needed is a pressure differential sensor which incorporates a low friction, free moving piston structure and a magnetic thermal lockout mechanism which uses a stationary thermal ferrite and a vibration insensitive magnetic actuated switch.

According to the present invention, there is provided a pressure differential sensor utilizing a free, reciprocably mounted piston which is sealed by low friction materials in a housing. A thermal lockout mechanism is provided which uses a permanent magnet mounted to one end of the piston, a housing mounted thermal ferrite adjacent to the permanent magnet, and a magnetically actuated axial travel switch. The pressure differential sensor according to the present invention is, thus, substantially insensitive to vibration and shock, very sensitive to operational temperature, able to carry aarge electrical currents, and generally more economical and sensitive than prior art pressure differential sensors.

The presuure differential sensor switch according to the present invention is designed to be utilized in a liquid circulation system, such as an hydraulic system or a circulating oil lubrication system, to sense the contamination of the filter that is usually used in such a system, the gradual contamination of the filter leading to a gradually increasing pressure differential between the inlet, or high pressure side of the filter, and the outlet, or low pressure side of the filter. The sensor of the pressure differential sensor switch is calibrated to actuate the switch that is a part thereof when the pressure differential across the filter reaches a predetermined allowable maximum, corresponding to a maximum allowable degree of contamination of the filter. The electrical signal from the switch, when actuated, can be used to disconnect the pump that is used to circulate the liquid being filtered, sound an alarm horn, turn on a signal light, or switch the operation of the liquid circulating system to a mode in which the filter is bypassed.

The pressure differential sensor switch according to the present invention has a housing with a cylindrical passage therein. A floating piston is positioned in the cylindrical passage of the housing, and the opposite sides of the piston are connected to the high pressure and low pressure sides of the associated filter, respectively, through openings in the housing. A spring is provided to resiliently urge the piston toward the high pressure end of the cylindrical passage, and the force of the spring acting on the piston will maintain the piston at the high pressure end until the pressure differential across the piston reaches a first predetermined value. When the pressure differential across the piston reaches the first predetermined value, the force resulting from the pressure differential will exceed the force resulting from the spring. As the pressure differential increases the piston will begin to move within the cylindrical passage to the low pressure end of the passage. The piston carries a permanent magnet attached to one end thereof. The movement of the piston in the cylindrical passage will be to a location that actuates the associated switch by the increase in magnetic forces resulting from the change in the position of the magnet, as it moves with the piston. This location is reached when a second predetermined pressure differential is reached, which is equal to the predetermined maximum allowable pressure differential in the fluid system.

The magnet position sensing switch that is used to sense the change in position of the magnet is an axial travel switch which utilizes a movable magnetic-iron armature element, the switch being moved from its normally open position to a closed position by the magnetic force that acts thereon when the permanent magnet carried by the pressure differential sensing piston moves with respect to the axial travel switch as a result of a maximum allowable pressure differential condition. The movement axially of the magnetically permeable armature element of the axial travel switch helps to prevent accidental movement of the switch element as a result of mechanical vibrations or impacts in tne associated system due, as can happen in reed switches, to the relatively high inertia and substantial magnetization of the switching element. The switch is arranged, with respect to the piston, so that the path of travel of the switch is normal to the path of the travel of the piston. This arrangement will help to ensure that the switching element will be moved from the opened position to the closed position when an excessive pressure differential condition does develop, because the perpendicularity of the path of travel of the axial travel switch leads to a high maximum to minimum differential of the magnetic force acting on the axial travel switch for given amount of movement of the pressure differential sensing piston.

Because the pressure differential sensor switch of the present invention is designed to be used in an environment that is subject to mechanical impacts or vibrations, the elements of the switch are housed in a rugged housing and the non-movable elements of the switch are retained in position within the housing by an epoxy potting compound that imparts good shock resistance to them. The housing is provided with a pair of spaced-apart raised mounting bosses to permit it to be securely affixed at two locations to the structure of the liquid circulating system. The portion of the sensor switch that houses the axial travel switch is hermetically sealed from the portion that houses the pressure differential sensing piston and from the environment external to the bypass sensor switch, with the electrical lead to and from the switch being sealed at the location of their entry into the switch chamber. The pressure differential sensing piston is protected from contamination by any dirt or other impurities in the circulating fluid by a filter that extends across the inlet port, and a low frictional hysteresis Teflon ® seal is provided to seal the movement of the pressure differential sensing piston for rapid response to a high pressure differential condition while maintaining an effective seal.

The thermal lockout feature of the pressure differential sensor switch is accomplished by means of a thermal ferrite which is located adjacent to the permanent magnet. Thermal ferrites are materials that are ferromagnetic below a characteristic temperature, called the Curie temperature. However, above the Curie temperature, a thermal ferrite drastically diminishes in magnetic susceptibility, becoming paramagnetic. Generally, the range of temperature over which this change in susceptibility occurs is on the order of a narrow temperature range, typically 25° to 50° centigrade. This temperature dependent magnetic susceptibility property of thermal ferrites can be used to regulate actuation of the axial travel switch when the permanent magnet is moved close thereto in response to increasing differential pressure acting on the piston, by placing the thermal ferrite in a fixed location adjacent to the permanent magnet. When the temperature is below the Curie temperature, the thermal ferrite is ferromagnetic, that is, very magnetically permeable, causing the magnetic field of the permanent magnet to be substantially confined inside the thermal ferrite, unaffecting the axial travel switch mgnetic elements. When the temperature is above the Curie temperature, the thermal ferrite substantially loses its magnetic susceptibility, becoming paramagnetic. Now the magnetic field of the permanent magnet can magnetize the magnetic elements in the axial travel switch, causing it to actuate. The thermal ferrite is selected to have a Curie temperature which corresponds to the temperature at which fluid viscosity no longer is a significant cause of the pressure differential registered across both ends of the piston.

It is an object of the present invention to provide an improved pressure differential bypass sensor which includes a magnetically operated low temperature lockout mechanism.

It is another object of the present invention to provide a pressure differential bypass sensor switch which has a magnetically actuated low temperature lockout feature that uses a fixed position thermal ferrite to regulate switch actuation in response to temperature.

It is still a further object of the present invention to provide a pressure differential bypass sensor switch that has a low temperature lockout feature that uses a free, low friction mounted, reciprocable piston to regulate switch actuation in response to pressure differential.

It is still a further object of the present invention to provide a pressure differential bypass sensor switch that can carry large electrical currents and is substantially vibration and shock insensitive.

For a further understanding of the present invention and the objects thereof, attention is directed to the drawing and the following description thereof, to the detailed description of the invention, and to the appended claims.

DETAILED DESCRIPTION OF THE PREFERRED EMBODIMENT

Figure 1:
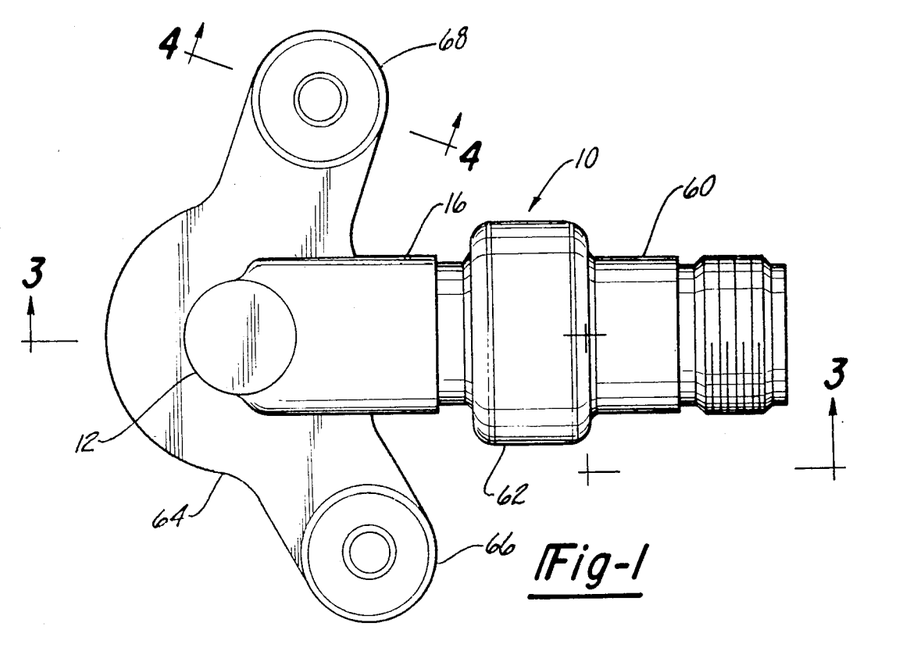
FIG. 1 is a plan view of a pressure differential bypass sensor switch, according to the invention.
Figure 2:
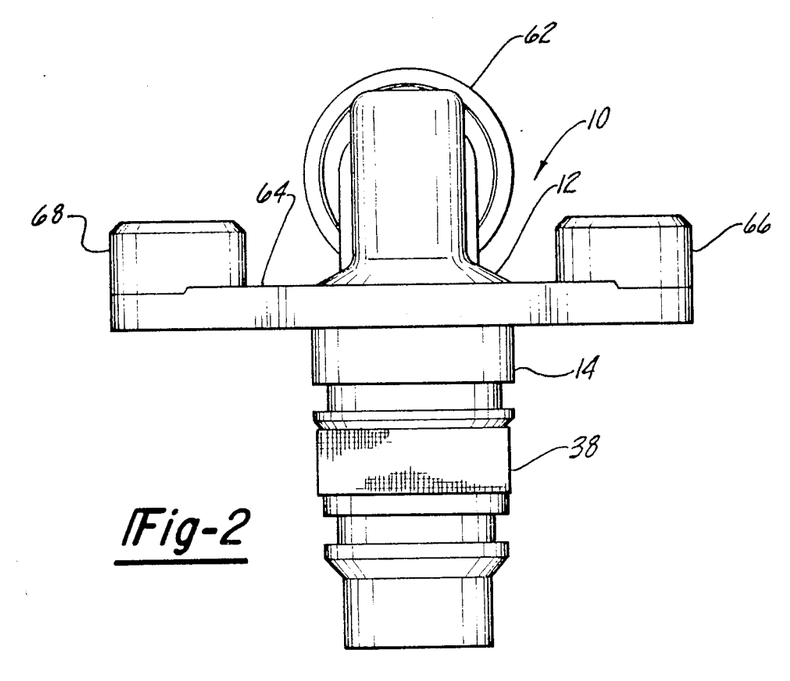
FIG. 2 is a side elevational view of the pressure differential bypass sensor switch illustrated in FIG. 1.
Figures 3, 4:
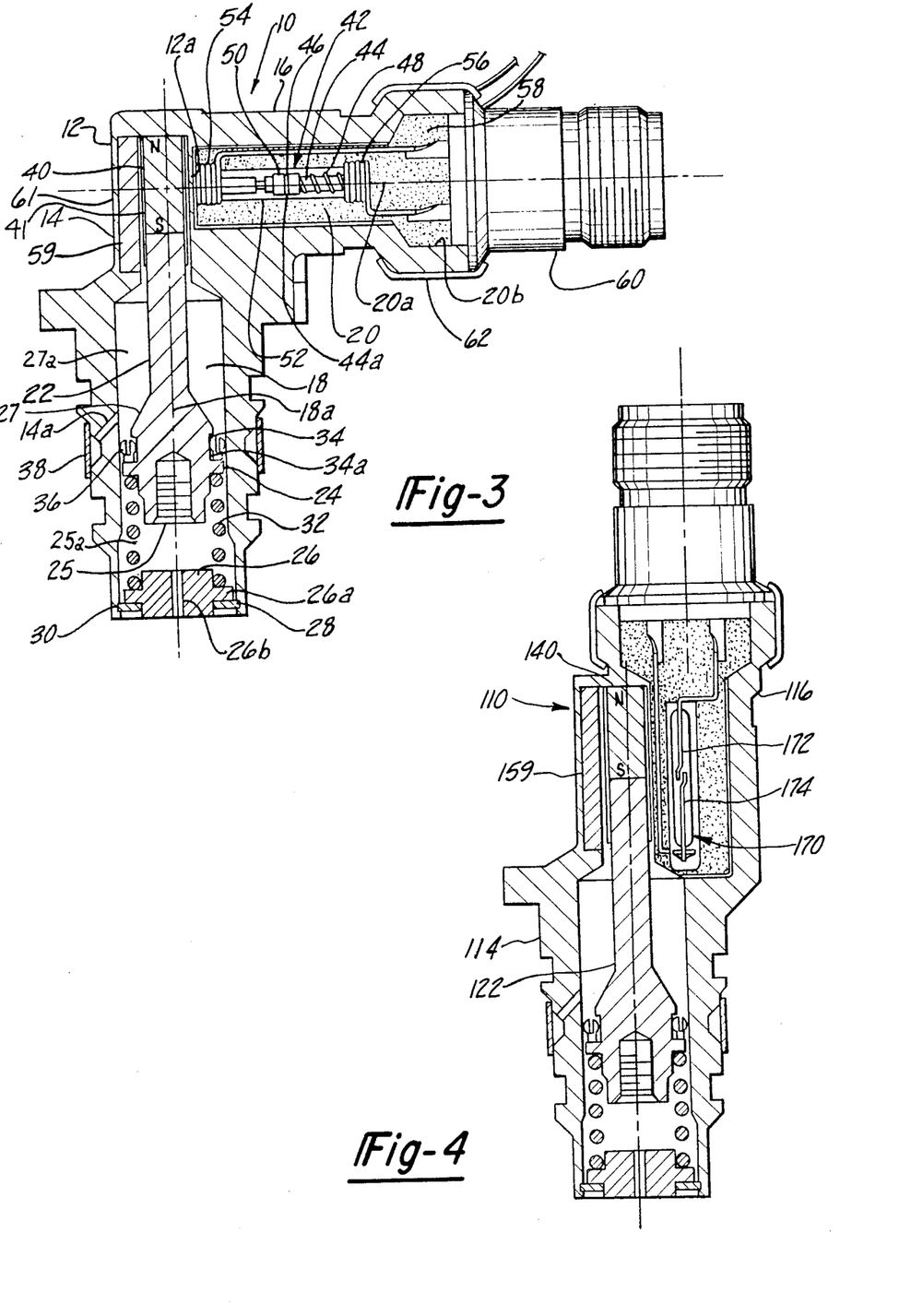
FIG. 3 is an offset, partially sectional view taken along line 3—3 of FIG. 1.
FIG. 4 is an offset, partially sectional view of an alternative embodiment of the invention.

Referring now to the figures, FIGS. 1 and 2 show a pressure differential bypass sensor switch according to the present invention which is generally indicated by reference numeral 10. The sensor switch 10 includes a housing 12, and the housing 12 includes first and second hollow legs 14 and 16 that extend perpendicularly with respect to one another. Referring now to FIG. 3, the first leg 14 is bored to define a first passage 18 therein, and the second leg 16 is also bored to define a second passage 20 therein. The first passage 18 has a central axis 18a extending therethrough, and the second passage 20 has a central axis 20a extending therethrough. The central axis 18a of the first passage 18 and the central axis 20a of the second passage 20 intersect each other at a right angle, for reasons which will be subsequently discussed more fully. However, as illustrated in FIG. 3, the second passage 20 stops before it intersects the first passage 18 and a portion 12a of the housing separates the first passage 18 from the second passage 20.

A reciprocable piston 22 is positioned within the first passage 18 of the housing 12, and is reciprocable in the first passage 18 along the central axis 18a thereof. The reciprocable piston 22 has its maximum radial extent at a radially outwardly projecting annular shoulder 24 and the radial extent of the annular shoulder 24, or diameter in the case of an annular shoulder of circular configuration, forms a close sliding fit with the inside of the first passage 18, as is shown in FIG. 3. The end of the first passage 18 which is away from the location of the intersection of the central axis 18a of the first passage 18 and the central axis 20a of the second passage 20, which is at the lower end of the sensor switch 10, is partially closed by an annular spring retainer 26. The annular spring retainer 26 has a radially outermost portion 26a in the form of a shoulder, and is removably held in place relative to the open end of the first passage 18 by means of a split retaining ring 28, the outermost portion of which is removably received in an annular slot 30 that extends radially outwardly from the first passage 18, near the open end thereof. A compression spring 32 is trapped between one side of the annular shoulder 24 and one side of the annular spring retainer 26. Therefore, the compression spring 32 resiliently biases the reciprocable piston 22 upwardly within the first passage 18 in the arrangement depicted in FIG. 3.

In the orientation of the bypass sensor switch 10 that is depicted in FIG. 3 the piston has a first portion 25 which is expoeed to the low pressure side of a pressurized fluid being circulated in a fluid circulation system, for example, hydraulic fluid in an hydraulic system or lubricating oil in a lubricating oil system, through an opening 26b in the annular spring retainer 26. The piston has a second portion 27 which is exposed to the high pressure side of the circulating fluid in the circulating system through an opening 14a in the first leg 14. The pressure differential between the peessure at the opening 14a and the pressure at the opening 26b exists by virtue of an obstruction to flow in the fluid circulating system, for example, a filter (not shown), wherein the pressure at the opening 14a is the pressure at the inlet to such filter and the pressure at the opening 26b is the pressure at the outlet of such filter. The pressure differential between the pressure at the opening 14a and the pressure at the opening 26b exerts a pressure differential force on the reciprocable piston 22 which tends to move the reciprocable piston 22 against the force exerted thereon by the compression spring 32, toward the opening 26b. The sensor switch 10 is calibrated so that the pressure differential force acting on the reciprocable piston 22, by virtue of the pressure differential between the pressure at the opening 14a and the pressure at the opening 26b, is normally insufficient to overcome the oppositely directed force imposed by the compression spring 32, when the pressure drop across the associated filter is below a first predetermined pressure differential across the filter, a value which is characterized by the filter becoming contaminated. The sensor switch 10 is additionally calibrated so that when the pressure differential across the filter equals a second predetermined pressure differential, the force on the reciprocable piston 22 caused thereby will be equal to a maximum allowable pressure differential in the fluid system, whereupon the reciprocable piston 22 will have moved to a second lccation, which will be defined later.

The reciprocable piston 22 has a radially inwardly projecting annular groove 34 which, in cooperation with the annular shoulder 24, forms an annular recess 34a. An annular seal 36 is positioned in the annular recess 34a and is trapped therein. The annular seal defines the separation between the first and second portion 25 and 27 of the reciprocable piston 22, and serves to maintain the pressure differential between the two portions of the reciprocable piston. Thus, the annular seal 36 will reciprocate with the reciprocable piston 22 to define a first chamber 25a communicating with the first portion 25 of the reciprocable piston and a second chamber 27a communicating with the second portion 27 of the reciprocable piston. Preferably, the annular seal 36 is a pressure-energized polymeric seal, such as a Teflon ® seal, which is capable of providing an effective sealing characteristic, while maintaining a low coefficient of friction characteristic as the reciprocable piston reciprocates within the first passage 18. To prevent any contaminants which are in the circulating liquid from damaging or otherwise interfering with the proper operation of the reciprocable piston 22, an anuular filter 38 is positioned around the first leg 14 to remove any such contaminants from the circulating liquid before it enters into the first passage 18 through the opening 14a.

An elongate permanent magnet 40 is attached to an upper portion 41 of the reciprocable piston 22. The permanent magnet 40, because it is carried by the reciprocable piston 22, reciprocates therewith, within the first passage 18, in response to the change in pressure differential and the spring forces that act on the reciprocable piston 22, as described above. The second location of movement of the reciprocable piston aforementioned, when the fluid system has a maximum allowable fluid pressure differential, is defined by the center between the poles of the permanent magnet 40 being located at the central axis 20a in the second passage 20.

An axial travel switch, identified generally by reference numeral 42, is positioned in the second passage 20 of the housing 12. As shown in FIG. 3, the axial travel switch 42 is of the normally open type; a type which is commercially available is sold by Electronic Applications Co. of El Monte, Calif. The axial travel switch 42 includes an axially movable switching element 44 that is in the shape of an elongated slender rod, its central axis being coaxial with the central axis 20a of the second passage 20. The switching travel of the axially movable switching element 44 is along its central axis. The relatively large inertia of the axially movable switching element, compared to that of the thin blades of conventional reed switches, makes the axial travel switch 42 largely insensitive to vibration and shock. The axially movable switching element 44 is manufactured from a magnetically permeable material and it functions as a movable pole piece in a magnetic circuit which includes a fixed pole piece 50 which is also made of a magnetically permeable material. The fixed pole piece 50 is normally spaced from a contact surface 44a on the axially movable switching element 44 by a magnetic gap 46. The axially movable switching element 44 is normally biased by a spring 48 away from the fixed pole piece 50, but the force of the spring 48 is not sufficient to maintain the axially movable switching element 44 out of contact with the fixed pole piece 50 when the axial travel switch is exposed to the external magnetic field caused by the movement of the permanent magnet 40 toward the opening 26b, as described above. The axially movable switching element 44, the fixed pole piece 50, and the spring 48 are sealed in a glass tube 52 to protect their electrical and magnetic characteristics from change due to a change in humidity or other environmental characteristics and to protect them from external physical impacts. The opposite ends of the glass tube 52 are capped by metallic end caps, not shown, and are surrounded by spring clips 54 and 56, respectively, which permit the attachment of electrical leads, not shown, to the ends of the axial travel switch 42 without soldering. The entire axial travel switch 42 is securely positioned within the second passage 20 by means of an epoxy potting compound 58. A metered charge of uncured epoxy compound 58 is placed in the second passage 20 before the axial travel switch 42 is placed into the second passage 20. The axial travel switch 42 is placed into the uncured epoxy potting compound 58 in the second passage 20 causing the uncured epoxy potting compound 58 to fill out the second passage 20. The epoxy potting compound 58 is then cured.

Referring to FIG. 3, it will be seen that positioned adjacent the permanent magnet 40 is thermal ferrite 59. The thermal ferrite is selected to have a Curie temperature corresponding to a temperature at which viscosity of the system fluid is no longer a significant factor in causing the fluid pressure differential across the fluid system filter. It will be further see that the thermal ferrite is located in the housing of the first hollow leg 14 adjacent a thin wall 61. This is to ensure excellent thermal equilibrium between the thermal ferrite 59 and the system fluid.

When the system fluid is at a temperature above the Curie temperature, the thermal ferrite 59 acts like a paramagnetic material. Consequently, the magnetic field of the permanent magnet is not appreciably affected by its presence, and when the reciprocable piston 22 moves so that the north pole of the permanent magnet 40 is aligned with the axial travel switch, it will cause the axial travel switch 42 to actuate.

When the system fluid is at a temperature below the Curie temperature, the thermal ferrite 59 acts like a ferromagnetic material. Consequently, the magnetic field of the permanent magnet 40 is significantly affected by its presence, causing the magnetic field to be substantially confined to the highly magnetically permeable thermal ferrite 59. As a result, when the reciprocable piston 22 moves the permanent magnet 40 so that its north pole is in alignment with the axial travel switch 42, very little magnetization will occur in the magnetic elements of the axial travel switch, and the axial travel switch will remain open.

In operation slightly above the Curie temperature, when the pressure differential across the filter in the fluid circulating system exceeds the first predetermined value, the reciprocable piston 22 will be driven downwardly toward the opening 26b by the excess of the force resulting from the pressure differential over the force exerted by the compression spring 32, as previously described, bringing one of the poles of the permanent magnet 40, shown in FIG. 3 as the north pole, into a positio of alignment with the end of the axial travel switch 42 that is adjacent thereto. Because the temperature is above the Curie temperature, the magnetic field of the permanent magnet 40 interacts strongly with the axial travel switch 42. The magnetic field exposure of the axially movable switching element 44 by the north pole of the permanent magnet 40 will cause magnetization and consequent attraction between the axially movable switching element 44 and the fixed pole piece 50. This, in turn, causes the contact surface 44a of the axially movable switching element 44 to come into contact with the fixed pole piece 50, thus, permitting electricity to flow through the leads that connect, respectively, to the axially movable switching element 44 and the fixed pole piece 50. The electricity flowing through the electrical leads is used to actuate other elements of the fluid circulating system (not shown) to bypass the associated filter as explained above, or to perform some other useful function, for example, lighting a signal light, or sounding an alarm horn, to indicate the existence of an allowable maximum differential pressure condition or excessive pressure differential condition in the associated filter.

The axial travel switch 42 is structured so that the axially movable switching element 44 will not actuate the fixed pole piece 50 when the permanent magnet 40 is in its position shown in FIG. 3; it will only be actuated when a pole, shown as the north pole, is aligned with the axial travel switch. The housing 12 is, accordingly, selected of materials which will enender this result, such as aluminum, brass and other nonmagnetic materials.

In operation below the Curie temperature, when the pressure differential across the filter and the fluid circulating system exceeds the first predetermined value, the reciprocable piston 22 will be driven downwardly toward the opening 26b, as described above. However, when the north pole of the permanent magnet 40 has moved into alignment with the axial travel switch 42, no actuation of the switch elements will occur. This is because at this operating temperature the thermal ferrite 59 will be ferromagnetic, resulting in the magnetic field of the permanent magnet 40 interacting only very weakly with the axial travel switch 42. Accordingly, the electrical circuit will not be closed when the axial travel switch 42 is in the presence of the permanent magnet 40, so that the aforementioned signal of excessive pressure differential will not occur.

In assembly, the second passage 20 has an extreme end 20b through which the axial travel switch 42 is inserted. After the insertion of the axial travel switch 42 in the epoxy potting compound 58, as heretofore described, the extreme end 20b of the second passage 20 is sealingly closed by attaching a standard switch/receptacle assembly 60 to the second leg 16 of the sensor switch 10. The switch/receptacle assembly 60 is attached to the second leg 16 of the sensor switch 10 by means of a retainer sleeve 62 which, for example, is a metal sleeve which is swagged into the configuration depicted in FIG. 3 after the switch/receptacle assembly 60 is assebled into the desired position relative to the second leg 16 of the housing 12.

To permit the sensor switch to be securely mounted relative to an associated element of the liquid circulating system, not shown, the housing 12 is also provided with a flange 64 that extends outwardly from each side thereof as shown in FIG. 1. The opposite ends of the flange 64 are provided with raised bosses 66 and 68 to provide for secure, two-point attachment of the housing 12 of the sensor switch 10 to suitable mounting lugs on the associated element.

While a pressure differential bypass sensor switch with magnetic thermal lockout has been described preferably using an axial travel switch, it is possible for those skilled in the art to substitute other types of magnetically actuated electrical switches. For instance, the technology for fabricating reed type electrical switches has recently made possible higher electrical current carrying capacity in reed switches. Therefore, as these advances continue, it may be desired to use such an electrical switch in the sensor switch described above.

An alternative embodiment of the invention using a reed type electrical switch is shown in FIG. 4. Therein, a sensor switch 110 is substantially similar to the sensor switch 10 of FIG. 3 except it has been modified to operate with a reed switch instead of an axial travel switch. It is preferred to rearrange a first leg 114 and a second leg 116 so that they are parallel to each other in order to increase the efficiency of the magnetic field acting on each blade of the reed switch. A permanent magnet 140 is located on a piston 122 as described above for FIG. 3. A thermal ferrite 159 is located adjacent the permanent magnet 140, also as described above for FIG. 3. A reed switch 170, composed of two blades 172 and 174, is located in the former location of the axial travel switch of the sensor switch of FIG. 3. The reed switch 170 is selected so that the spring constant and magnetic susceptibility of the blades are such that, when the permanent magnet 140 is in the location that is shown in FIG. 4, the blades will not be sufficiently magnetized to touch each other; however, when the center of the permanent magnet is aligned with the tips of the blades 172 and 174, the induced magnetism in the blades does cause them to touch.

In operation, when fluid differential pressure causes the piston 122 to move downwardly in the manner described above for the embodiment of FIG. 3, the permanent magnet 140 will cause the reed switch blades 172 and 174 to magnetize and attract each other, causing them to touch and complete the electrical circuit. When operating at temperatures below the Curie temperature, however, the thermal ferrite 159 will act as a ferromagnetic material, confining the magnetic field of the permanent magnet 140 so that the reed switch blades will not be sufficiently magnetized so as to cause sufficient magnetic attraction between them to overcome the spring biasing action of the reed switch blades. Consequently, the reed switch blades will not touch and the electrical circuit will remain open.

Having, thus, described the present invention by way of an exemplary embodiment, it will be apparent to those skilled hn the art that many modifications may be made from the exemplary embodiment without departing from the spirit of the present invention or the scope of the claims appended hereto.

What is claimed is:

1. A sensor switch for measuring fluid pressure differential of a fluid between a first location in a fluid system which is at low pressure and a second location in the fluid system which is at high pressure, said sensor switch comprising:

housing means for locating said sensor switch in said fluid system;

a reciprocable piston sealingly and slidingly mounted in said housing means, said reciprocable piston being exposed at one end to said low pressure in said fluid system, said reciprocable piston being exposed at its other end to said high pressure in said fluid system, said pressure differential in said fluid system thereby resulting in said piston being fluidically biased in a first direction;

biasing means located in said housing means for biasing said reciprocable piston in a second direction that is opposite to said first direction, said piston having a net biasing in said second direction when said fluid pressure differential in said fluid system is less than a first predetermined value, said piston having a net biasing in said first direction when said fluid pressure differential in said fluid system exceeds said first predetermined value;

a permanent magnet attached to said reciprocable piston, said permanent magnet being reciprocable with said reciprocable piston between a first and a second position in said housing means, said permanent magnet being at said first position when said differential fluid pressure in said fluid system is less than said first predetermined value, said permanent magnet being at said second position when said differential fluid pressure in said fluid system is equal to a second predetermined value;

an electrical switch actuatable by a magnetic field, said electrical switch being attached to said housing means at a location in which said permanent magnet can only actuate said electrical switch when said permanent magnet is substantially at said second position in said housing means; and a thermal ferrite material fixedly attached to said housing means adjacent said permanent magnet when said permanent magnet is at said second position in said housing means, said thermal ferrite material having a predetermined Curie temperature, said thermal ferrite material preventing said electrical switch from being actuated when said thermal ferrite material is at a temperature below said Curie temperature.

2. The sensor switch of claim 1, wherein said second predetermined fluid pressure differential is an allowable maximum fluid pressure differential across a fluid filter in said fluid system.

3. The sensor switch of claim 2, wherein said Curie temperature of said thermal ferrite material corresponds to a temperature of said fluid in said fluid system above which viscosity of said fluid is not a substantial cause of said second predetermined fluid pressure differential.

4. The sensor switch of claim 3, wherein said electrical switch is selected from the group consisting of axial travel switches and reed switches.

5. The sensor switch of claim 4, wherein said housing means is substantially nonmagnetic.

6. A sensor switch for detecting fluid pressure differential across a filter in a fluid system, one side of said filter being exposed to a fluid in said fluid system which is at low pressure, the other side of said filter being exposed to said fluid in said fluid system which is at high pressure, said sensor switch comprising:

- housing means for locating said sensor switch in said fluid system;
- a reciprocable piston sealingly and slidably mounted in said housing means, said reciprocable piston being reciprocable between a first and a second stop position in said housing means, said reciprocable piston being exposed at one end to said fluid in said fluid system which is at low pressure, said reciprocable piston being exposed at its other end to said fluid in said fluid system which is at high pressure, said pressure differential across said filter in said fluid system thereby resulting in said piston being fluidically biased towards said second stop position;
- a spring located in said housing means biasing said reciprocable piston towards said first stop position, said reciprocable piston having a net biasing towards said first stop position when said fluid pressure differential in said fluid system is less than a first predetermined value, said reciprocable piston having a net biasing towards said second stop position when said fluid pressure differential in said fluid system exceeds said first predetermined value, said reciprocable piston being at said first stop position when said fluid differential pressure is less than said first predetermined value, said recpprocable piston being at said second stop position when said fluid differential pressure is equal to an allowable maximum fluid differential pressure across said filter in said fluid system;
- a permanent magnet attached to said reciprocable piston, said permanent magnet being reciprocable with said reciprocable piston;
- an electrical switch actuatable by a magnetic field, said electrical switch being attached to said housing means at a location in which said permanent magnet can only actuate said electrical switch when said reciprocable piston is substantially at said second stop position in said housing means; and
- a thermal ferrite material fixedly attached to said housing means adjacent said permanent magnet when said reciprocable piston is at said second stop position in said housing means, said thermal ferrite material having a predetermined Curie temperature, said thermal ferrite material preventing said electrical switch from being actuated when said thermal ferrite material is at a temperature below said Curie temperature.

7. The sensor switch of claim 6, wherein said Curie temperature of said thermal ferrite material corresponds to a temperature of said fluid in said fluid system above which viscosity of said fluid is not a substantial cause of said second predetermined fluid pressure differential.

8. The sensor switch of claim 7, wherein said electrical switch is selected from the group consisting of axial travel switches and reed switches.

9. The sensor switchoof claim 8, wherein said housing means is substantially nonmagnetic.

10. A pressure differential sensor switch for use in a fluid circulating system, said pressure differential sensor switch performing an electrical switching function when an excessive pressure differential develops between a high fluid pressure location in said fluid circulating system and a low fluid pressure location in said fluid circulating system, said pressure differential switch comprising:

- a housing having a first passage with a central axis and a second passage with a central axis, said first passage having a first opening exposed to said high fluid pressure location, said first passage further having a second opening exposed to said low fluid pressure location, said central axis of said second passage being disposed in a non-parallel orientation with respect to said central axis of said first passage;
- a reciprocable piston sealingly and slidingly mounted in said first passage in said housing, said reciprocable piston being reciprocable between a first and a second stop position, said reciprocable piston having a first end that is exposed through said first opening to fluid pressure from said high fluid pressure location, said reciprocable piston having a second end exposed through said second opening to fluid pressure from said low pressure location, said reciprocable piston being thereby fluidically biased towards said second stop position, said reciprocable piston being at said first stop position when said fluid differential pressure is less than a first predetermined value, said reciprocable piston being at said second stop position when said fluid pressure differential reaches a second predetermined value;
- biasing means located in said housing for biasing said reciprocable piston toward said first stop position, said reciprocable piston having a net biasing toward said first stop position when said fluid pressure differential in said fluid circulating system is less than said first predetermined value, said reciprocable piston having a net biasing toward said second stop position when said fluid pressure differential in said fluid circulating system exceeds said first predetermined value;
- a permanent magnet attached to said reciprocable piston, said permanent magnet being reciprocable with said reciprocable piston;
- an axial travel electrical switch located in said second passage in said housing, said axial travel electrical switch having a magnetically susceptible switching element that is movable only along said central axis of said second passage, said magnetically susceptible switching element being movably responsive to magnetism of siid permanent magnet only when said reciprocable piston is substantially at said second stop position, said axial travel electrical switch being actuated when said magnetically susceptible switching element responds movably to said magnetism of said permanent magnet; and
- a thermal ferrite material fixedly attached to said housing adjacent said permanent magnet when said piston is at said second stop position, said thermal ferrite material having a predetermined Curie temperature, said thermal ferrite material preventing said axial travel electrical switch from being actuated when sadd thermal ferrite material is at a temperature below said Curie temperature.

11. The sensor switch of claim 10, wherein said second predetermined fluid pressure differential is an excessive fluid pressure differential across a fluid filter in said fluid circulating system.

12. The sensor switch of claim 11, wherein said Curie temperature of said thermal ferrite material corresponds to a temperature of said fluid in said fluid circulating system above which viscosity of said fluid is not a substantial cause of said second predetermined fluid pressure differential.

13. The sensor switch of claim 12, wherein said housing is substantially nonmagnetic.

* * * * *

UNITED STATES PATENT AND TRADEMARK OFFICE
CERTIFICATE OF CORRECTION

PATENT NO. : 4,792,651

DATED : December 20, 1988

INVENTOR(S) : James C. Whiting

It is certified that error appears in the above-identified patent and that said Letters Patent is hereby corrected as shown below:

Column 1, line 19, delete "peessure" and insert ---- pressure ----.

Column 1, line 35, delete "lmited" and insert ---- limited ----.

Column 2, line 39, delete "aarge" and insert ---- large ----.

Column 2, line 42, delete "presuure" and insert ---- pressure ----.

Column 3, line 6, delete "resultIng" and insert ---- resulting ----.

Column 3, line 32, delete "tne" and insert ---- the ----.

Column 3, line 61, delete "lead" and insert ---- leads ----.

Column 4, line 25, delete "mgnetic" and insert ---- magnetic ----.

Column 5, line 51, delete "expoeed" and insert ---- exposed ----.

Column 5, line 59, delete "peessure" and insert ---- pressure ----.

UNITED STATES PATENT AND TRADEMARK OFFICE
CERTIFICATE OF CORRECTION

PATENT NO. : 4,792,651    Page 2 of 3

DATED : December 20, 1988

INVENTOR(S) : James C. Whiting

It is certified that error appears in the above-identified patent and that said Letters Patent is hereby corrected as shown below:

Column 6, line 19, delete "lccation" and insert ---- location ----.

Column 6, line 41, delete "anuu" and insert ---- annu ----.

Column 7, line 42, after "is" insert ---- a ----.

Column 8, line 13, delete "positio" and insert ---- position ----.

Column 8, line 30, after "filter" insert a comma ---- , ----.

Column 8, line 42, delete "enender" and insert ---- engender ----.

Column 9, line 5, delete "assebled" and insert ---- assembled ----.

Column 9, line 67, delete "hn" and insert ---- in ----.

In the Claims

Column 11, line 29, delete "recpproca-" and insert ---- reciproca- ----.

UNITED STATES PATENT AND TRADEMARK OFFICE
CERTIFICATE OF CORRECTION

PATENT NO. : 4,792,651

DATED : December 20, 1988

INVENTOR(S) : James C. Whiting

It is certified that error appears in the above-identified patent and that said Letters Patent is hereby corrected as shown below:

Column 11, line 59, delete "switchoof" and insert ---- switch of ----.

Column 12, line 44, delete "siid" and insert ---- said ----.

Column 12, line 55, delete "sadd" and insert ---- said ----.

Signed and Sealed this

Sixth Day of June, 1989

Attest:

DONALD J. QUIGG

Attesting Officer

Commissioner of Patents and Trademarks